United States Patent
Conner et al.

(10) Patent No.: US 12,531,164 B2
(45) Date of Patent: Jan. 20, 2026

(54) BOTTOM NOZZLE WITH INTERNAL DEBRIS FILTER

(71) Applicant: Westinghouse Electric Company LLC, Cranberry Township, PA (US)

(72) Inventors: Michael E. Conner, Elgin, SC (US); Thanh H. Do, Columbia, SC (US); Caroline K. Duncan, Columbia, SC (US); Robert A. Brewster, Mars, PA (US); Artem Aleshin, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 643 days.

(21) Appl. No.: 17/595,486

(22) PCT Filed: May 18, 2020

(86) PCT No.: PCT/US2020/033381
§ 371 (c)(1),
(2) Date: Nov. 17, 2021

(87) PCT Pub. No.: WO2020/236702
PCT Pub. Date: Nov. 26, 2020

(65) Prior Publication Data
US 2022/0254523 A1     Aug. 11, 2022

Related U.S. Application Data

(60) Provisional application No. 62/850,642, filed on May 21, 2019.

(51) Int. Cl.
*G21C 3/32* (2006.01)
*G21C 3/33* (2006.01)
*G21C 19/30* (2006.01)

(52) U.S. Cl.
CPC .......... *G21C 3/3206* (2013.01); *G21C 3/3305* (2013.01); *G21C 19/30* (2013.01)

(58) Field of Classification Search
CPC ..... G21C 3/3206; G21C 19/30; G21C 3/3305
(Continued)

(56) References Cited

U.S. PATENT DOCUMENTS

| 5,225,152 A | 7/1993 | Verdier |
| 5,473,650 A * | 12/1995 | Johansson ............ G21C 3/3206 376/352 |

(Continued)

FOREIGN PATENT DOCUMENTS

| KR | 101826045 B1 | 2/2018 |
| KR | 101851181 B1 | 6/2018 |

(Continued)

OTHER PUBLICATIONS

International Search Report and Written Opinion for International PCT Application No. PCT/US2020/033381, dated Nov. 24, 2020.

*Primary Examiner* — Jack W Keith
*Assistant Examiner* — Daniel Wasil
(74) *Attorney, Agent, or Firm* — K&L Gates LLP (57) ABSTRACT

A debris filter bottom nozzle for a nuclear reactor fuel assembly. The nozzle comprising venturi-shaped flow passages within a plate body. At least one flow passage has a filter therein, with the uppermost and lowermost ends of the filter being situated between the upper and lower ends of the flow passage. The plate body, the flow passages, and each filter are co-formed as a single piece unitary body. The co-forming may be via additive manufacturing.

16 Claims, 3 Drawing Sheets

(58) Field of Classification Search
USPC .......................................................... 376/352
See application file for complete search history.

(56) References Cited

U.S. PATENT DOCUMENTS

| | | | |
|---|---|---|---|
| 6,608,880 B2 | 8/2003 | Smith et al. | |
| 7,822,165 B2 | 10/2010 | Broach | |
| 8,317,035 B2 | 11/2012 | Elkins et al. | |
| 2005/0157836 A1* | 7/2005 | Broach | G21C 3/3206 376/362 |
| 2017/0352438 A1 | 12/2017 | Broach et al. | |
| 2020/0373025 A1* | 11/2020 | Aleshin | G21C 3/3206 |
| 2022/0406476 A1* | 12/2022 | Blavius | G21C 3/3206 |

FOREIGN PATENT DOCUMENTS

| | | |
|---|---|---|
| KR | 101851184 B1 | 6/2018 |
| TW | 552587 A | 9/2003 |
| TW | I366198 B | 6/2012 |
| TW | I731692 B | 6/2021 |
| WO | 2010031770 A1 | 3/2010 |
| WO | 2018170428 A1 | 9/2018 |
| WO | 2020236702 A2 | 11/2020 |

\* cited by examiner

BOTTOM NOZZLE WITH INTERNAL DEBRIS FILTER

CROSS-REFERENCE TO RELATED APPLICATIONS

This application is a U.S. National Stage Entry under 35 U.S.C. § 371 of International Patent Application No. PCT/US2020/033381, entitled BOTTOM NOZZLE WITH INTERNAL DEBRIS FILTER, filed May 18, 2020, which claims benefit under 35 U.S.C. § 119 (e) to U.S. Provisional Patent Application No. 62/850,642, which was filed on May 21, 2019, the entire disclosures of which are hereby incorporated by reference herein.

FIELD

The present invention relates generally to nuclear reactors and, more particularly, is concerned with reducing the size of debris that can pass through a bottom nozzle of a nuclear fuel assembly while minimizing the pressure drop across the same.

BACKGROUND

The number of leaking fuel rods due to debris fretting has increased in recent years. Thus, there is a need minimize the amount of debris that could damage the fuel rod cladding by improving the debris filtering efficiency of the fuel assembly inlet region (bottom nozzle/protective grid). However, making abrupt changes to the geometry of the fuel assembly inlet region can abruptly change the flow area, thereby increasing the pressure drop associated with the bottom nozzle flow plate. Since coolant also travels through the flow passages of the bottom nozzle to the reactor core, traditional filtration measures can consequentially cause a detrimental disruption of flow distribution within the fuel assembly. It is critical to prevent the flow in the reactor core from decreasing. Therefore, there is a need to reduce the quantity of debris that can travel through the flow passages, while minimizing any adverse effect on the flow of coolant to the reactor core.

For example, existing designs use a debris filter bottom nozzle that has an array of small, closely spaced flow passages in conjunction with a protective grid whose straps either bisect or quadrisect the debris filter bottom nozzle flow passages. The "protective grid" refers to the plurality of straps of a fuel assembly and that are arranged in a grid pattern to support and position the fuel rods of the fuel assembly. A reduced pressure drop bottom nozzle, as is described in U.S. Pat. No. 7,822,165 B2, the disclosure of which is herein incorporated by reference in its entirety, was developed through the addition of a double inlet chamfer to closely resemble a venturi-like profile that can be manufactured through conventional manufacturing methods (i.e. machining). However, the development of additive manufacturing (AM) has enabled the design of a bottom nozzle including flow passages that are of an even more venturi-shaped profile, such as those disclosed in U.S. Pat. No. 9,847,144 B1, the disclosure of which is herein incorporated by reference in its entirety.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a debris filter bottom nozzle for use in a nuclear reactor is disclosed. The debris filter bottom nozzle includes a plate-like body and a plurality of flow passages formed within the plate-like body. Each flow passage of the plurality of flow passages includes an inlet proximal to a first surface of the plate-like body and an outlet proximal to a second surface of the plate-like body. The second surface of the plate-like body is opposite the first surface of the plate-like body. The debris filter bottom nozzle also includes a filter positioned within at least one flow passage of the plurality of flow passages. The filter is situated between the inlet and the outlet of the flow passage, and at least one dimension of the flow passage is determined based at least in part on a predetermined loss coefficient of the at least one flow passage and a predetermined filtration capability of the filter. In other aspects, the plate-like body, flow passages, and filter can be co-formed using additive manufacturing techniques and constitute a single-piece unit.

In various aspects, a flow passage formed within a debris filter bottom nozzle is disclosed. The debris filter bottom nozzle can be overlaid with a protective grid including a plurality of straps. The flow passage includes an inlet, an outlet, and an internal cavity formed between the inlet and the outlet. A plurality of filtering ligaments are positioned within the internal cavity and are configured to transect the plurality of straps. A dimension of the flow passage is determined based at least in part on a predetermined loss coefficient of the flow passage and a predetermined filtration capability of the plurality of filtering ligaments.

In various aspects, a method of manufacturing a debris filter bottom nozzle including a plurality of flow passages is disclosed. The method includes determining a predetermined loss coefficient of the debris filter bottom nozzle, determining a predetermined filtration capability of the debris filter bottom nozzle, calculating a dimension of the plurality of flow passages based at least in part on the predetermined loss coefficient and the predetermined filtration capability, producing a plate-like body of debris filter bottom nozzle, producing the plurality of flow passages within the plate-like body of the debris filter bottom nozzle, wherein at least one of the flow passages of the plurality of flow passages includes the calculated dimension; and producing a filter comprising the predetermined filtration capability within the at least one flow passage. In some aspects, calculating the dimension includes the use of computational fluid dynamics. In other aspects, the production of the plate-like body, the plurality of flow passages, and the filter includes the use of additive manufacturing techniques such that the plate-like body, the plurality of flow passages, and the filter are co-formed and constitute a single-piece unit.

BRIEF DESCRIPTION OF THE DRAWINGS

Various features of the aspects described herein, together with advantages thereof, may be understood in accordance with the following description taken in conjunction with the accompanying drawings as follows.

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the aspects as described in the specification and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 20%, 15%, 10%, 9%, 8%, 7%, 6%, 5%, 4%, 3%, 2%, 1%, 0.5%, or 0.05% of a given value or range.

Figure 1:
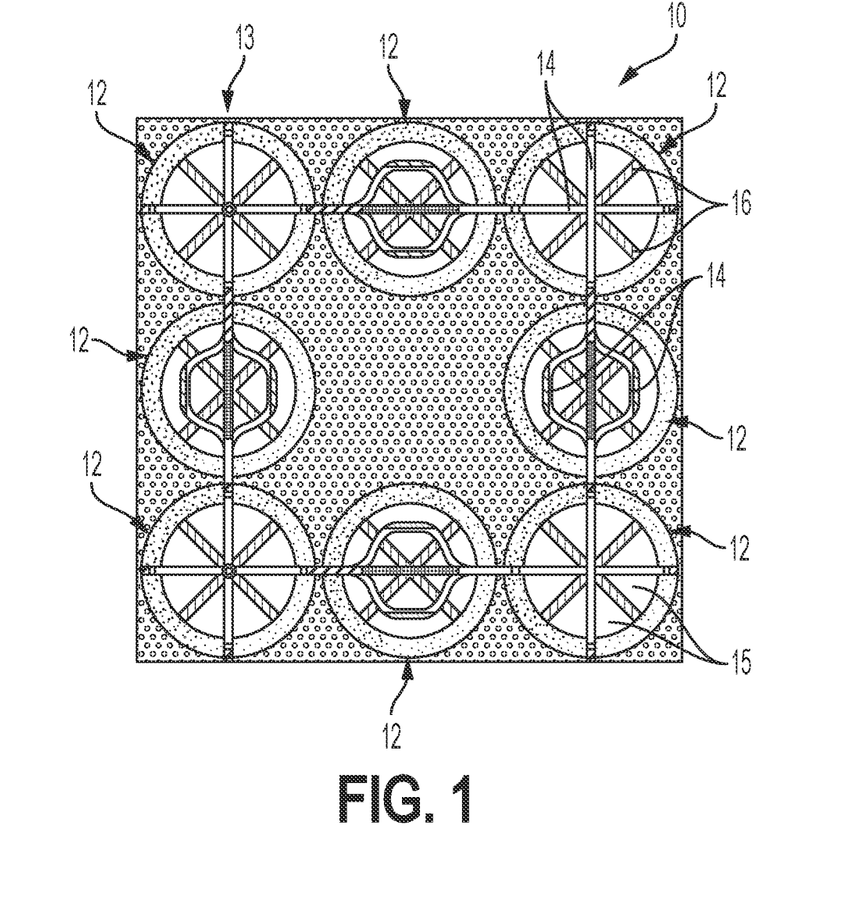
FIG. 1 illustrates a top view of a debris-filtering bottom nozzle including an array of flow passages according to one aspect of the present disclosure.

FIG. 1 illustrates a debris filter bottom nozzle 10 including a plurality of flow passages 12 and a protective grid 13 according to one aspect of the present disclosure. In the non-limiting aspect of FIG. 1, the flow passages 12 can include filtering features, such as filtering ligaments 16. In the depicted exemplary aspect, the filtering ligaments 16 can be co-formed with the bottom nozzle 10 as a single piece unit via additive manufacturing. However, the present disclosure contemplates alternate forms and methods of manufacture. For example, in one non-limiting aspect, the filtering ligaments 16 can be independently manufactured of a separate material and subsequently inserted into the flow passages 12, and mechanically coupled to the bottom nozzle 10. With the advantageous addition of the filtering ligaments 16 to be situated within the flow hole 12, the size of debris that can pass through the bottom nozzle 10 adapter plate is reduced, thereby reducing debris fretting.

The protective grid 13 is similar to the grids disclosed in U.S. Pat. No. 7,889,829, the disclosure of which is herein incorporated by reference in its entirety. It includes a plurality of straps 14 which can be configured to assist in filtering the debris that can pass through the flow passages 12 of the fuel assembly 10. However, the straps 14 are not configured to completely obstruct the flow passages 14 and the protective grid 13 can further include openings 15 between the straps 14.

The present disclosure contemplates flow passages 12 and filtering ligaments 16 of varying shapes and configurations to optimize both debris filtration and pressure drop across the bottom nozzle 10. For example, the debris filtering ligaments 16 of FIG. 1 include a cruciform shape (i.e. an "X" shape) such that they transect the flow passage 12 of the debris filter bottom nozzle 10 and the openings 15 of the protective grid 13. Furthermore, the flow passages 12 of the debris filter bottom nozzle 10 of FIG. 1 are overlaid with a protective grid 13, such that straps 14 of the protective grid 13 further transect at least some of the flow passages 12. The debris filtering ligaments 16 of FIG. 1 are obliquely oriented relative to the straps 14 of the protective grid 13, thereby reducing the size of debris that can pass through the flow passages 12 of the debris filter bottom nozzle 10 adapter plate. As employed herein, the expression "oblique" refers to a relationship that is neither parallel nor perpendicular.

Figure 2:
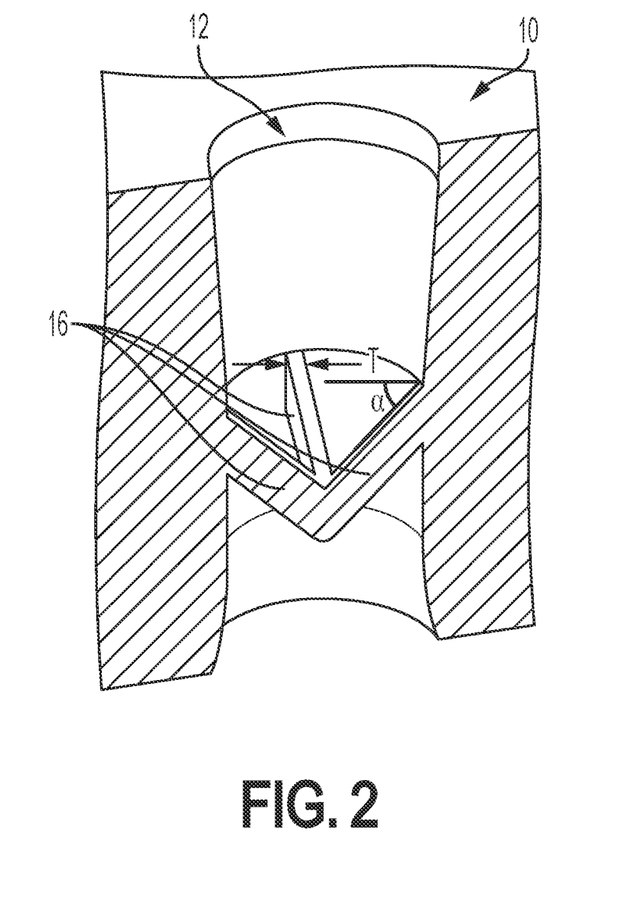
FIG. 2 illustrates a cross-sectional isometric view of a flow passage of the debris-filtering bottom nozzle of FIG. 1.

The filtering ligaments 16 of FIG. 1 can be implemented within flow passages of varying designs. For example, FIG. 2 depicts filtering ligaments 16 implemented within a venturi-shaped flow passage 12, similar to those of the debris filter bottom nozzle disclosed by U.S. Pat. No. 9,847,144 B1. The geometry and design of the filtering ligaments 16 can be specifically configured to accommodate for the particular flow passage 12 and optimize debris filtration across the debris filter bottom nozzle 10.

The geometry and design of the flow passage 12 and filtering ligaments 16 can also be specifically configured based on the material and method of manufacture. For example, the flow passages 12, filtering ligaments 16, and bottom nozzle 10 of FIG. 2 are co-formed out of a single material via an additive manufacturing procedure. Accordingly, the thickness T of the filtering ligaments 16 can range from about 0.005 to 0.050 inches, dependent upon the type of material used. However, alternate methods of manufacture are contemplated by the present disclosure. For example, in one non-limiting aspect, the filtering ligaments 16 can be independently manufactured of a separate material and subsequently inserted into the flow passages 12, and mechanically coupled to the bottom nozzle 10. Accordingly, the flow passage 12 and filtering ligaments 16 of FIG. 2 are merely exemplary, and other non-limiting aspects include a variety of designs to optimize debris filtration, as enabled by a variety of flow passage geometries and methods of manufacture.

The filtering ligaments 16 can also be oriented in varying configurations relative to the flow passage 12 geometry to improve debris filtration, a flow characteristic of the flow passage 12, and/or the ease of manufacture of the debris filter bottom nozzle 10. For example, when viewed in the isometric view, the filtering ligaments 16 of FIG. 2 are oriented as downward-facing pyramid as to allow for printing with additive manufacturing techniques. However, the present disclosure contemplates filtering ligaments 16 oriented in a variety of desirable configurations and/or shapes, including but not limited to a rectangle, a dome, and/or any other suitable shape. For example, in other non-limiting aspects of the present disclosure, the filter ligaments 16 are oriented as a downward-facing dome. Although the filtering ligaments 16 of FIG. 2 are oriented at angle α defined between each filtering ligament 16 and an interior wall of the flow passage 12, and are thus downward-facing, the present disclosure contemplates varying angles α such that in some non-limiting aspects, the filtering ligaments 16 are upward-facing or level relative to the flow passage 12. For example, in other non-limiting aspects of the present disclosure, the filtering ligaments can be oriented as an upward-facing pyramid, dome, or rectangle, when viewed from the side.

Still referring to FIG. 2, four filtering ligaments 16 can be oriented in a downward-facing pyramid extending from a plane that is approximately parallel to a plane defined by an inlet of the flow passage 12, and each filtering ligament 16 can be generally straight. However, the present disclosure contemplates other non-limiting aspects including any number of filtering ligaments 16 of a varying geometries. For example, according to one non-limiting aspect, three filtering elements 16 can be oriented in a dome configuration, wherein each of the three filtering ligaments 16 is generally arcuate in its shape. Similarly, the present disclosure contemplates flow passages 12 with greater than four filtering ligaments 16, and flow passages 12 with less than four filtering ligaments 16. Additionally and/or alternatively, the filtering ligaments can be oriented at varying angles α such that they extend from varying planes defined within the flow passage 12.

In further reference to FIGS. 1 and 2, it is estimated that the depicted configuration of straps 14 and filtering ligaments 16 effectively reduces the size of debris that can pass through the flow passages 12 approximately 2.5 times. Specifically, if the flow passages 12 lacked the filtering ligaments 16 of FIG. 1, it is estimated that debris filter bottom nozzle 10 would restrict debris of approximately 0.2 inch diameter or larger from passing through. Contrarily, it is estimated that the inclusion of the "X" shaped filtering ligaments 16 of FIGS. 1 and 2 enables the debris filter bottom nozzle 10 to restrict debris of approximately 0.08 inch diameter or larger from passing through the flow passages 12. It is reiterated that the particular configuration of filtering ligaments 16 of FIGS. 1 and 2 is depicted and discussed only for the sake of example. Accordingly, the specific configuration of flow passages 12, filtering ligaments 16, and/or straps 14 can be attenuated or adjusted to optimize the performance of the bottom nozzle 10 according to user preference and/or design constraints.

Still referring to FIGS. 1 and 2, an "X" shaped configuration of four filtering ligaments 16, or any alternate configuration of filtering ligaments 16, can filter undesirable debris to reduce undesirable debris fretting. However, the obstruction of the flow passage 12 can increase the loss coefficient (i.e., pressure loss) through the flow passage. For example, the Darcy-Weisbach equation can be used to calculate a pressure loss along the flow passage:

$$\Delta p = L \cdot f_d \cdot \frac{\rho}{2} \cdot \frac{v^2}{D}$$

Where Δp is the pressure loss through the flow passage 12, L is a length of the flow passage 12, $f_D$ is a darcy friction factor of the flow passage 12, ρ is a density of the fluid traversing the flow passage 12, υ is an average velocity of a fluid traversing the flow passage 12, and D is an flow diameter of the flow passage 12. Accordingly, the present disclosure contemplates the optimization of the shape and configuration of the flow passages 12 to maintain the loss coefficient, such as pressure loss through the flow passage 12, including a configuration of filtering ligaments 16. Using the Darcy-Weisbach equation to illustrate, adding filtering ligaments 16 to the flow passage 12 reduces the effective D of the flow passage which will increase the pressure drop. To maintain the same pressure drop of the flow passage 12, changes must be made to the flow hole to accommodate the increased pressure drop from the filtering ligaments. The selection of the Darcy-Weisbach equation is strictly exemplary and the present disclosure contemplates the use of various calculations and optimization techniques to achieve the desired flow characteristics and filtration capabilities of the flow passages 12. For example, the use of Computational Fluid Dynamics (CFD) can advantageously optimize an average diameter or length of the flow passage 12 relative to the specific size and configuration of the filtering ligaments 16, such that the loss coefficient across the debris filter bottom nozzle 10 is minimized.

Figure 3:
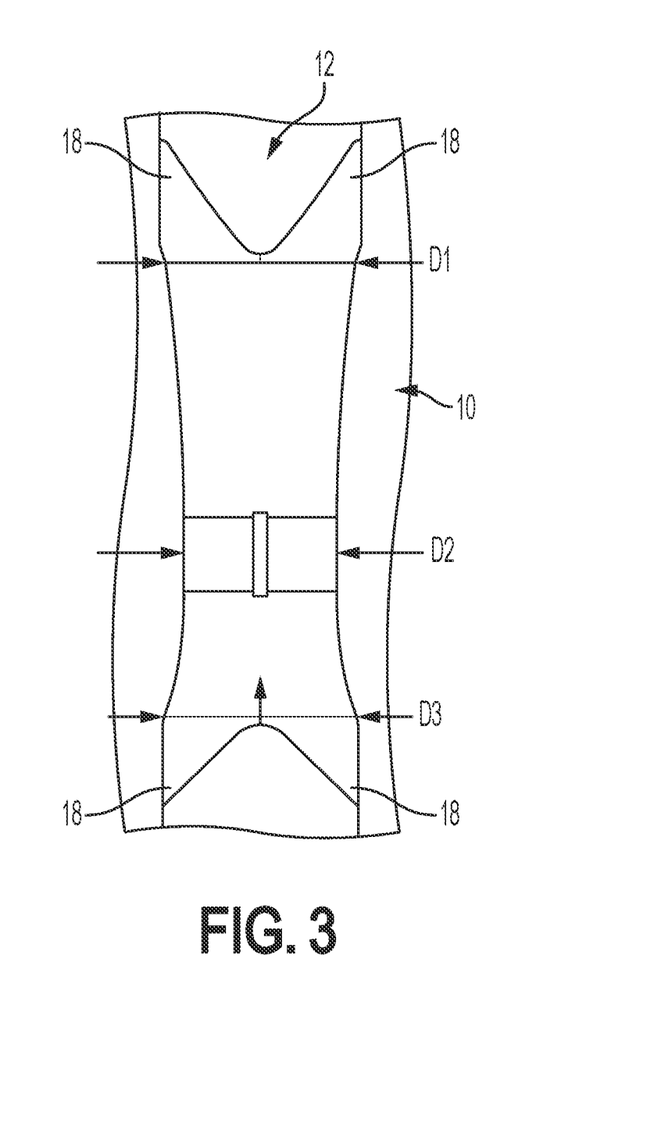
FIG. 3 illustrates a cross-sectional side view of the flow passage of FIG. 2.

Accordingly, the present disclosure contemplates flow passages of varying geometries and configurations to compensate for increased loss coefficients resulting from the inclusion of filtering ligaments 16. For example, FIG. 3 illustrates a side view a flow passage 12 of a debris filter bottom nozzle 10, in accordance with at least one non-limiting aspect of the present disclosure. The flow passage 12 of FIG. 3 includes a venturi-shaped design, similar to that disclosed by U.S. Pat. No. 9,847,144 B1, and a geometry that was advantageously selected to achieve a desired loss coefficient. For example, the configuration and diameter of flow passage 12 can be selected to maintain the loss coefficient of known bottom nozzles in spite of the obstruction of the filtering ligaments 16. However, the present disclosure contemplates flow passages 12 with design parameters that were specifically designed to achieve a multitude of flow characteristics.

As depicted in the non-limiting aspect of FIG. 3, the flow passages 12 can include a venturi-shaped configuration with a length L and varying diameters D1, D2, D3 that can be optimized relative to other parameters, including but not limited to a thickness, a height, a length and/or a orientation of the filtering ligaments 16 contained within the flow passage 12. Specifically, the bore diameter D2, or the minimum diameter in the center of the venturi-shaped flow passage 12 of FIG. 3, can be optimized using CFD to minimize the pressure drop associated with the inclusion of filtering ligaments 16. For example, the bore diameter D2 of the venturi-shaped flow passage 12 of FIG. 3 can range from about 0.100 to 0.500 inches, dependent upon the material from which it is formed. However, other non-limiting aspects of the present disclosure include flow passages 12 with bore diameters D2 of varying magnitudes to optimize either the debris filtration, a flow characteristic of the flow passage 12, and/or the method of manufacture of the debris filter bottom nozzle 10. Likewise, although the flow passage 12 of FIG. 3 includes a venturi-shaped configuration, a variety of shapes and/or configurations of the flow passage 12 are contemplated by the present disclosure.

In further reference to FIG. 3, the venturi-shaped configuration of the flow passage 12 is optimized to maintain a pressure drop of the debris filter bottom nozzle 10 relative to the pressure drop of known bottom nozzles. For example, the venturi-shape and diameters D1, D2, D3 of the flow passage 12 of FIG. 3 were determined using CFD. However, the present disclosure contemplates alternate means of design optimization, including but not limited to testing, computer modeling, manual modeling, and/or combinations thereof. For example, hydraulic testing on prototypes of the flow passages 12, and/or debris filter bottom nozzle 10 of varying scales could be performed to validate CFD predictions. Additionally, although the flow passage 12 is optimized to maintain a pressure drop of the debris filter bottom nozzle 10, in other non-limiting aspects of the present disclosure, the flow passage 12 is optimized for other flow characteristics, as desired.

Still referring to FIG. 3, the flow passage 12 can include wings 18 configured to extend above and/or below the debris filter bottom nozzle 10 as protrusions. Such wings 18 are further disclosed and described in U.S. Pat. No. 9,847,144, the disclosure of which is herein incorporated by reference in its entirety. For example, in some non-limiting aspects, the wings 18 can gradually increase the lateral flow area of the flow passage 12 to further alter the flow, as desired. Although the flow passage 12 of FIG. 3 includes wings 18, according to other non-limiting aspects of the present disclosure, the venturi-shaped flow passage 12 can be implemented without wings 18.

Various aspects of the subject matter described herein are set out in the following numbered clauses:

Clause 1: A debris filter bottom nozzle configured for use in a nuclear reactor, the debris filter bottom nozzle including a plate-like body, a plurality of flow passages formed within the plate-like body, wherein each flow passage of the plurality of flow passages includes an inlet proximal to a first surface of the plate-like body and an outlet proximal to a second surface of the plate-like body, wherein the second surface is opposite the first surface; and a filter positioned within at least one flow passage of the plurality of flow passages, wherein the filter is situated between the inlet and the outlet, wherein the at least one flow passage includes a dimension, wherein a magnitude of the dimension is determined based at least in part on a predetermined loss coefficient of the at least one flow passage and a predetermined filtration capability of the filter.

Clause 2: The debris filter bottom nozzle of clause 1, wherein the plate-like body, the plurality of flow passages, and the filter are co-formed and constitute a single-piece unit.

Clause 3: The debris filter bottom nozzle according to clauses 1 or 2, wherein the at least one flow passage includes a venturi-shape, and wherein the dimension is a bore diameter of the venturi-shape, wherein the bore diameter is greater than or equal to 0.1 inches and less than or equal to 0.5 inches, and wherein the predetermined loss coefficient is greater than or equal to 1.0 and less than or equal to 2.5.

Clause 4: The debris filter bottom nozzle according to any of clauses 1-3, wherein the filter includes a plurality of filtering ligaments that extend across at least a portion of the at least one flow passage, and wherein the predetermined filtration capability of the filter.

Clause 5: The debris filter bottom nozzle according to any of clauses 1-4, wherein the plurality of filtering ligaments are connected at a location within the flow passage between the inlet and the outlet.

Clause 6: The debris filter bottom nozzle according to any of clauses 1-5, wherein debris filter bottom nozzle is configured to be overlaid with a protective grid comprising a plurality of straps, wherein the plurality of filtering ligaments are configured to form a cruciform shape or other blockage when viewed from either the inlet or the outlet, and wherein the plurality of filtering ligaments are configured to transect the plurality of straps.

Clause 7: The debris filter bottom nozzle according to any of clauses 1-6, wherein each of the filtering ligaments of the plurality of filtering ligaments is straight, and wherein the plurality of filtering ligaments are configured to form a pyramid between the inlet and the outlet of the at least one flow passage.

Clause 8: The debris filter bottom nozzle according to any of clauses 1-7, wherein each of the filtering ligaments of the plurality of filtering ligaments is oriented at an angle such that the pyramid is directed towards the outlet of the at least one flow passage.

Clause 9: The debris filter bottom nozzle according to any of clauses 1-8, wherein each of the filtering ligaments of the plurality of filtering ligaments is oriented at an angle such that the pyramid is directed towards the inlet of the at least one flow passage.

Clause 10: The debris filter bottom nozzle according to any of clauses 1-9, wherein each of the filtering ligaments of the plurality of filtering ligaments is arcuate, and wherein the plurality of filtering ligaments are configured to form a dome between the inlet and the outlet of the at least one flow passage.

Clause 11: The debris filter bottom nozzle according to any of clauses 1-10, wherein each of the filtering ligaments of the plurality of filtering ligaments is oriented at an angle such that the dome is directed towards the outlet of the at least one flow passage.

Clause 12: The debris filter bottom nozzle according to any of clauses 1-11, wherein each of the filtering ligaments of the plurality of filtering ligaments is oriented at an angle such that the dome is directed towards the inlet of the at least one flow passage.

Clause 13: The debris filter bottom nozzle according to any of clauses 1-12, wherein the plurality of filtering ligaments are configured to form a three-dimensional rectangle between the inlet and the outlet of the at least one flow passage.

Clause 14: The debris filter bottom nozzle according to any of clauses 1-13, wherein the at least one flow passage further includes a wing extending beyond at least one of the first surface and the second surface.

Clause 15: A flow passage formed within a debris filter bottom nozzle configured for use in a nuclear reactor, wherein the debris filter bottom nozzle is configured to be overlaid with a protective grid, wherein the protective grid includes a plurality of straps, the flow passage comprising an inlet, an outlet, an internal cavity formed between the inlet and the outlet, a plurality of filtering ligaments positioned within the internal cavity, wherein the plurality of filtering ligaments are configured to transect the plurality of straps; and a dimension, wherein a magnitude of the dimension is determined based at least in part on a predetermined loss coefficient of the flow passage and a predetermined filtration capability of the plurality of filtering ligaments.

Clause 16: The flow passage according clause 15, wherein the internal cavity includes a venturi-shape, and wherein the dimension is a bore diameter of the venturi-shape.

Clause 17: The flow passage according to clause 15 or 16, wherein the flow passage and plurality of filtering ligaments are co-formed with the debris filter bottom nozzle and constitute a single-piece unit.

Clause 18: A method of manufacturing a debris filter bottom nozzle configured for use in a nuclear reactor, wherein the debris filter bottom nozzle includes a plurality of flow passages, the method including determining a predetermined loss coefficient of the debris filter bottom nozzle, determining a predetermined filtration capability of the debris filter bottom nozzle, calculating a dimension of the plurality of flow passages based at least in part on the predetermined loss coefficient and the predetermined filtration capability, producing a plate-like body of debris filter bottom nozzle, producing the plurality of flow passages within the plate-like body of the debris filter bottom nozzle, wherein at least one of the flow passages of the plurality of flow passages includes the calculated dimension: and producing a filter comprising the predetermined filtration capability within the at least one flow passage.

Clause 19: The method according to clause 18, wherein calculating the dimension includes the use of computational fluid dynamics.

Clause 20: The method according to clauses 18 or 19, wherein the plate-like body, the plurality of flow passages, and the filter are produced using additive manufacturing techniques such that the plate-like body, the plurality of flow passages, and the filter are co-formed and constitute a single-piece unit.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A. B. and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect." "in an aspect." "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a". "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 20%, 15%, 10%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A debris filter bottom nozzle configured for use in a nuclear reactor fuel assembly, the debris filter bottom nozzle comprising:
    a plate body;
    a plurality of flow passages formed within the plate body, wherein each flow passage of the plurality of flow passages comprises an inlet proximal to a first surface of the plate body and an outlet proximal to a second surface of the plate body, wherein the second surface is opposite the first surface,
    wherein at least one flow passage of the plurality of flow passages has a filter respectively positioned therein, the filter comprising an uppermost end and a lowermost end,
    wherein each of the at least one flow passage comprises a venturi-shape having:
        an upper end in communication with the outlet and defining a first diameter;
        a central portion defining a second diameter; and
        a lower end in communication with the inlet and defining a third diameter;
        the second diameter being less than the first diameter and the third diameter,
        wherein the uppermost end of the filter and the lowermost end of the filter are situated between the upper end of the venturi-shape and the lower end of the venturi-shape, and
    wherein the plate body, the plurality of flow passages, and each filter are co-formed as a single piece unitary body.

2. The debris filter bottom nozzle of claim 1, wherein plate body, the plurality of flow passages, and each filter are co-formed out of a single material via additive manufacturing.

3. The debris filter bottom nozzle of claim 1, wherein the second diameter is a minimum diameter of the venturi-shape and is greater than or equal to 0.1 inches and less than or equal to 0.5 inches.

4. The debris filter bottom nozzle of claim 3, wherein each filter:
    comprises a plurality of filtering ligaments that extend across at least a portion of the at least one flow passage; and
    restricts any debris comprising a diameter of approximately 0.08 inches or larger from traversing the at least one flow passage.

5. The debris filter bottom nozzle of claim 4, wherein the plurality of filtering ligaments are connected at a location within the flow passage between the inlet and the outlet.

6. The debris filter bottom nozzle of claim 5, wherein:
    the plurality of filtering ligaments form a cruciform shape when viewed from either the inlet or the outlet, and
    the at least one flow passage is overlaid with a protective grid comprising a plurality of straps, wherein the plurality of filtering ligaments are obliquely oriented relative to the plurality of straps.

7. The debris filter bottom nozzle of claim 5, wherein each of the plurality of filtering ligaments is straight, and wherein the plurality of filtering ligaments are configured to form a pyramid between the inlet and the outlet of the at least one flow passage.

8. The debris filter bottom nozzle of claim 7, wherein each of the plurality of filtering ligaments is oriented at an angle such that the pyramid is directed towards the outlet of the at least one flow passage.

9. The debris filter bottom nozzle of claim 7, wherein each of the plurality of filtering ligaments is oriented at an angle such that the pyramid is directed towards the inlet of the at least one flow passage.

10. The debris filter bottom nozzle of claim 5, wherein each of the plurality of filtering ligaments is oriented at an angle such that they are directed towards the outlet of the at least one flow passage.

11. The debris filter bottom nozzle of claim 5, wherein each of the plurality of filtering ligaments is oriented at an angle such that they are directed towards the inlet of the at least one flow passage.

12. The debris filter bottom nozzle of claim 3, wherein the at least one flow passage further comprises a wing that extends to increase a lateral flow area of the at least one flow passage.

13. The debris filter bottom nozzle of claim 2, wherein each filter comprises a plurality of filtering ligaments that extend across at least a portion of the at least one flow passage.

14. The debris filter bottom nozzle of claim 13, wherein the plurality of filtering ligaments are connected at a location within the flow passage between the inlet and the outlet.

15. The debris filter bottom nozzle of claim 14, wherein:
   the plurality of filtering ligaments form a cruciform shape when viewed from either the inlet or the outlet, and
   the at least one flow passage is overlaid with a protective grid comprising a plurality of straps, wherein the plurality of filtering ligaments are obliquely oriented relative to the plurality of straps.

16. The debris filter bottom nozzle of claim 1, wherein the at least one flow passage further comprises a wing that extends to increase a lateral flow area of the at least one flow passage.

* * * * *